(12) United States Patent
Cummings et al.

(10) Patent No.: US 12,706,918 B1
(45) Date of Patent: Aug. 11, 2026

(54) SEAMLESS CONSUMER INTEGRATION OF ACCESS TO A GENERATIVE RESPONSE ENGINE

(71) Applicant: OpenAI OpCo, LLC., San Francisco, CA (US)

(72) Inventors: David Cummings, San Francisco, CA (US); Athyuttam Eleti, San Francisco, CA (US); Miqdad Jaffer, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/240,026

(22) Filed: Jun. 17, 2025

(51) Int. Cl.
*H04L 9/40* (2022.01)
*G06F 16/2457* (2019.01)
*H04L 9/32* (2006.01)

(52) U.S. Cl.
CPC ........ *H04L 63/102* (2013.01); *G06F 16/2457* (2019.01); *H04L 9/3228* (2013.01); *H04L 63/0421* (2013.01); *H04L 63/0428* (2013.01)

(58) Field of Classification Search
CPC ............... H04L 63/102; H04L 63/0421; H04L 63/0428; H04L 9/3228; G06F 16/2457
USPC ........................................................ 713/185
See application file for complete search history.

(56) References Cited

U.S. PATENT DOCUMENTS

| | | | | |
|---|---|---|---|---|
| 11,775,891 | B2 * | 10/2023 | Brown | G06F 16/9535 705/7.12 |
| 12,210,636 | B2 * | 1/2025 | Ortiz | H04L 9/3236 |
| 12,271,360 | B1 * | 4/2025 | Nguyen | G10L 15/183 |
| 12,307,349 | B2 * | 5/2025 | Lo | G06N 3/0455 |
| 2016/0292199 | A1 * | 10/2016 | Cronin | G06F 16/244 |
| 2021/0406386 | A1 * | 12/2021 | Ortiz | G06N 20/00 |
| 2025/0272424 | A1 * | 8/2025 | Gajdel | G06F 21/6218 |

* cited by examiner

*Primary Examiner* — Amare F Tabor
(74) *Attorney, Agent, or Firm* — Polsinelli PC

(57) ABSTRACT

A device may receive, from a user of a computing device and via an application, a user query. A device may generate a data package comprising the user query and user identity information. A device may transmit, via a company application programming interface (API) between the application and a generative response engine, the data package to the generative response engine. The generative response engine provides resources to process the user query based on entitlements associated with a user account. User anonymity and user entitlements can be fulfilled for the user experience when the user interacts with the generative response engine through the company API, even when the user is not logged into the generative response engine.

20 Claims, 5 Drawing Sheets

SEAMLESS CONSUMER INTEGRATION OF ACCESS TO A GENERATIVE RESPONSE ENGINE

BACKGROUND

Generative response engines such as language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries. Existing applications may provide interactions with users for specific tasks but often do not have the capability of a more powerful generative response engine.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
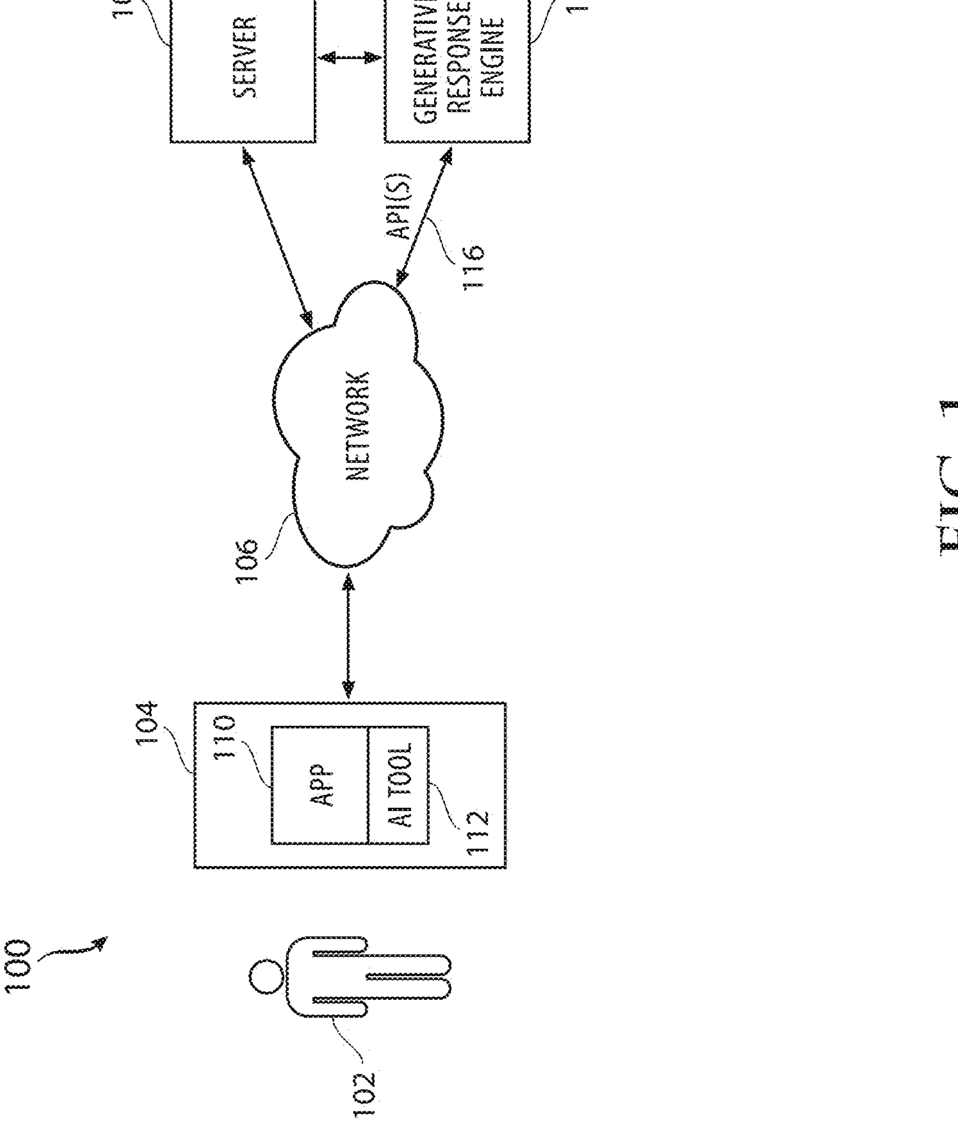
FIG. 1 illustrates an example system including an application that interacts with a user and communicates with a network-based server in accordance with some aspects of the present technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Generative response engines can include AI models such as language models that represent a significant milestone in the field of artificial intelligence, revolutionizing computer-based natural language understanding and generation. AI models, powered by advanced deep learning techniques, have demonstrated astonishing capabilities in tasks such as text generation, translation, summarization, and even code generation.

Users, in many cases, will interact with a consumer application on a mobile device or other computing device. The application may include some level of artificial intelligence where particular tasks can be performed. For example, Apple's Siri® application enables users to perform certain tasks, such as playing a song or controlling smart home devices. In some cases, consumer applications (which can be called third-party applications), in addition to providing a certain level of service through their AI model, might have access to a separate and more powerful generative response engine. The third-party application may access the generative response engine via a corporate or company application programming interface (API). The company API provides a framework for the third-party application to make requests to and receive answers from the generative response engine. Such interactions can supplement the services of the third-party application. One reason such an application is called a "third-party application" is because in the context of the interactions between the user (a first party) and the generative response engine (a second party), there is a third-party which operates the application and which facilitates the communications. The third-party application may also refer to an agent, a chatbot, or any other component that may perform a first type of functionality or service but that can include an ability to package a request from a user and transmit it to the generative response engine as a supplement to the services the third-party application was designed to provide.

However, a new framework is needed to enable users to interact with the generative response engine through the third-party application in a manner consistent with their personal identity and entitlements, such as a personal user account with the generative response engine, while maintaining privacy relative to the third-party application and any associated network servers. The approach can also allow a rate-limiting mechanism in which the third-party application may be able to limit or reduce the use of resources of the generative response engine based on rate-limiting data specific to the user or personal user account 208. Further, other solutions can be provided as well such as communication between the third-party application and other applications that the user may interact with in the context of (1) obtaining requests from the user, (2) packaging those requests for transmission to the generative response engine and (3) managing responses from the generative response engine.

The following description is generally from the point of view of operations by a third-party application operating on a user device. However, as the methods or operations are described in the context of a communication channel, such as an application programming interface between the third-party application, a server and/or a generative response engine, a complementary set of methods can also be included as embodiments from the standpoint of the generative response engine, or secondary applications on the user device that also interact with the third-party application to achieve or respond to the questions of the user. Further, any feature or step provided in an example described herein can be utilized in any other example. Thus, in some aspects, any concept related to how to maintain privacy and rate-limiting management via the use of a company API configured with a third-party application and the generative response engine can also be used in other contexts such as when the third-party application coordinates communication with another application on the user device for managing queries to the generative response engine that relate to use of the other application.

As an example of a generative response engine, CHATGPT provided by OPENAI is widely understood to have been trained on Internet data and, in some respects, is an artificial intelligence tool that contains generalized knowledge from the Internet. While the Internet, and thereby CHATGPT, includes a vast amount of information, an even greater quantity and maybe a greater quality of data is not accessible on the Internet. Some voice-interactive applications such as Siri®, the level of training or the amount of data used for training is typically more limited. Such applications are trained to perform certain tasks like handling a music request or a request from a user to purchase a product. To address this relative weakness in some applications, this disclosure provides a number of new approaches which include an application escalating a request that they have received, but that they cannot handle, to a generative response engine like CHATGPT.

Accordingly, the present technology includes a system, protocol, and method by which a chatbot, tool, agent, application or front-end component can generate a data package from one or more of: a query, data from other active applications or inactive applications, files associated with an application, or other entities on a computer. The data package can include such obtained data, as well as user identification information such that the generative response engine can enable the utilization of resources from the personal user account even when the access to the generative response engine is from the API.

As used herein, a third-party application (which can also be called an agent, a tool, a chatbot, an application, a front-end component, an AI tool, or an AI assistance service) is any entity, including hardware and software entities. A third-party application may be considered an artificial intelligence tool or may be a more conventional algorithm that is configured to interact according to a protocol or system described herein. The third-party application can include a graphical user interface and an AI front-end service to enable both interactions with a user and exchanging instructions and information between an agent and the third-party application. In some cases, an agent may be built into or programmed into a third-party application in order to enable the private communications and rate-limiting mechanisms disclosed herein from the generative response engine, even when the third-party application accesses the generative response engine through a company API.

One aspect of this disclosure relates to escalating inquiries at a third-party application to a generative response engine when the third-party application and/or its AI model are not capable of properly responding to the inquiry. In general, the concepts disclosed herein relate to a third-party application that is not primarily programmed to be a conduit for the user to the generative response engine but includes the ability to supplement its existing capabilities by accessing the generative response engine. When doing so, the request to the generative response engine is generally considered as coming from the third-party application and not the user per se. Thus, the user may have an account or a subscription for a certain quality of service, but such entitlements may not be recognized when the request is received at the generative response engine from the third-party application or via a company API associated with the third-party application.

In some aspects, the techniques described herein relate to a system for providing enhanced natural language assistance. In some cases, where different applications are coordinating or sharing data, the user may be interacting with an application and provide a request which may be escalated to a generative response engine. The user may have a subscription or account associated with the generative response engine. Accessing the generative response engine via the application may utilize a company API. One approach enables the user's access to the generative response engine via the application to consume the resources on behalf of the user according to entitlements or rate-limits in the user's account. In some aspects, the techniques described herein relate to a method for providing access to a generative response engine, the method including receiving, from a user of a computing device and via an application, a user query; generating a data package comprising the user query and user identity information; and transmitting, via a company application programming interface between the application and a generative response engine, the data package to the generative response engine, wherein the generative response engine provides resources to process the user query based on entitlements associated with a user account of the user.

In some aspects, the techniques described herein relate to a system for providing enhanced natural language assistance. The system can include: at least one processor; and a computer-readable storage device storing instructions, which, when executed by the at least one processor, cause the at least one processor to be configured to: receive, from a user of a computing device and via an application, a user query; generate a data package comprising the user query and user identity information; and transmit, via a company application programming interface between the application and a generative response engine, the data package to the generative response engine, wherein the generative response engine provides resources to process the user query based on entitlements associated with a user account of the user.

Additional features and advantages of the disclosure will be set forth in the description which follows, and in part will be evident from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an environment 100 which includes a user 102, a user device 104, a network 106, and a server 108 that communicates with a third-party application 110. An artificial intelligence (AI) tool or AI tool 112 can be included with third-party application 110 to enable access to the server 108 to an AI model or generative response engine 114. AI tool 112 can be used to integrate responses and user interface capabilities or actions in connection with data from generative response engine 114. AI tool 112 can aid in user authentication, privacy-preserving operations, and management of user entitlements to access resources from generative response engine 114. The server 108 can also communicate with generative response engine 114 directly in some aspects.

Generative response engines are a class of artificial intelligence tools that can generate responses to prompts. Many generative response engines provide a conversational user interface powered by a chatbot, or in this case, third-party application 110, whereby personal user account 208 can be accessed by generative response engine 114 through natural language conversation with the chatbot or with third-party application 110. Such a user interface provides an intuitive format to provide prompts or instructions to generative response engine 114. The conversational user interface powered by the chatbot can be so effective that users feel as if they are interacting with a person. Some user accounts find the generative response engine effective enough that they utilize the conversational user interface powered by the chatbot as they would an assistant. When the user is accessing generative response engine 114 via third-party application 110, it may be for queries associated with the operations and capabilities of third-party application 110.

When third-party application 110 obtains access to generative response engine 114, it often does so via API(S) 116. API access to generative response engine 114 for third-party application 110 traditionally requires authentication via a developer account and API keys. The approach limits the integration of generative response engine capabilities and access flexibility. Consumer applications, such as third-party application 110, face challenges in seamlessly extending functionality while respecting entitlements that might be granted to an individual user of third-party application 110. Generative response engine 114 will receive queries from the API(S) 116 and not recognize or have knowledge that a particular user submitted the query. Without that knowledge, generative response engine 114 may provide high-value resources beyond the entitlements of that user or may provide resources below the entitlements of the user. For example, the user may have purchased a medium level subscription to use generative response engine 114. The level of service provided to the user when the generative response engine 114 is accessed through the third-party application 110 should, in some aspects, match the medium level subscription. The system may be configured such that the provided level of the quality of service is consistent with the user subscription. The third-party application may obtain information from the generative response engine 114 regarding rate-limiting operations or other changes to the quality of service for the user. Such information may also be private such that the third-party application 110 implements rate-limiting or other operations without knowledge of the identity of the user.

In one non-limiting example, third-party application 110 could be the application Siri, which is Apple's virtual assistant that is integrated into iOS, macOS, watchOS, and tvOS devices. Siri uses voice recognition and natural language processing to perform tasks like sending messages, making calls, setting reminders, searching the web, and controlling smart home devices. Activated by "Hey Siri" or a button press, it supports multiple languages and adapts to user preferences over time. Siri leverages Apple's ecosystem, including apps like Maps and Calendar, and emphasizes on-device processing for privacy. Third-party application 110 could also be Google Assistant or Alexa from Amazon. Third-party application 110 can represent any application having any input/output modality. In general, third-party application 110 relates to any application that is not primarily a front end for accessing a general AI model trained for open-ended requests. In general, this disclosure addresses the issue of a third-party application 110 supplementing its normal capabilities with additional access to generative response engine 114. The access is performed in ways that maintain user privacy and comply with user entitlements such as quality-of-service or rate-limiting management, even though the user is accessing generative response engine 114 through third-party application 110.

With the integration of AI advancements into these applications, the need to respect user entitlements and privacy becomes increasingly important. Third-party application 110 and/or server 108, which support operations, might access personal data that must remain confidential and not be shared with generative response engine 114. Further, the user may ask questions that are to be routed to generative response engine 114 that are also private and not meant to be shared with the company operating third-party application 110.

Thus, there are several areas of improvement for the context of third-party application 110, which is configured to interact with generative response engine 114. One aspect of the disclosed solution is the use of API access delegation, which allows an authenticated application, such as a third-party application 110, to consume resources of the generative response engine 114 on behalf of the user 102. The system can use consumer credentials both as an identity (a passport) as well as a repository of entitlements (suitcase). For example, when third-party application 110 receives a query from the user 102, third-party application 110 can generate a data package for transmission via API(S) 116 to generative response engine 114 that includes user identification information and/or entitlement information. Entitlement information might include a priority, subscription account that the user has paid for a higher quality of service from generative response engine 114. In some cases, the user may only be entitled to a certain amount of resources from generative response engine 114. An aspect of this disclosure includes the ability to incorporate a rate-limiting mechanism in which generative response engine 114 can notify third-party application 110 when a user's consumption limits are reached or about to be reached. The AI tool 112 can cause an interaction (via, i.e., a graphical user interface, an audio interface as with Siri, a multimodal interface, messaging or email interface, etc.) informing the user of the status of their access to resources. For example, Siri may state, "Mary, you are about to reach your limit of the use of the AI model, you have two more questions."

Such passport and entitlement information may be stored on user device 104. For example, third-party application 110 may access user identity or entitlement information from a secure element configured on user device 104 in such a manner that does not reveal the information to third-party application 110 or any associated computing devices. The information may be encrypted or tokenized using a one-time use token in a similar manner to financial transactions such as through Apple Pay.

In some aspects, the entitlements of the user can be provided in a "suitcase" as noted above to generative response engine 114, or generative response engine 114 may maintain a suitcase for the user. The suitcase can represent all documents uploaded to generative response engine 114, all past messages and/or responses, past memories, etc. This historical information can provide context or additional information to generative response engine 114 when generating responses. However, such information may not be desirable to share with third-party application 110 or server 108. Accessing the suitcase at generative response engine 114 can require the user identity or authentication credentials. In this case, since the user is not logging into an account at, for example, AImodel.com, these credentials are provided via third-party application 110 in a "passport" which is their identity to enable access to generative response engine 114. Again, note that the access to generative response engine 114 occurs via API(S) 116 of a developer account connected with the company providing third-party application 110, which is not a user account. Here, the new approach allows the company, an API user via a company API, to consume resources of generative response engine 114 against a consumer's allotment of resources rather than the generalized API and to receive information about rate limits against that consumer. Any data included in a data package transmitted to generative response engine 114 may be tokenized or encrypted to maintain the privacy of the information.

Further, the approach enables the user to have an experience with generative response engine 114 that is consistent with their account and expectations. For example, a user may have paid a premium for use of the most up-to-date training and data available for generative response engine 114. The user 102 may expect a certain quality of service based on their subscription to generative response engine 114. When, however, they access generative response engine 114 via third-party application 110, which communicates with generative response engine 114 via their company API such as API(S) 116, generative response engine 114 may not recognize or grant that same quality of service level. The disclosed concepts herein enable the personalized user experience, the quality of service, as well as rate limits for individual users, even when accessing generative response engine 114 through third-party application 110.

The use of AI tool 112 and other improvements also enables privacy-preserving resource management in which anonymous rate limiting can be performed without compromising user privacy. In this case, for example, the user may remain anonymous to the server 108 that operates or manages the use of third-party application 110, but proper metering of the user's access to high-value resources from generative response engine 114 can be maintained on an individualized basis. Specifically, the approach enables the metering of language model usage without aggregating or exposing user identities to third-party application 110 or the server 108. Consumption tracking can be performed on user device 104 to maintain compliance with privacy constraints.

Figure 2:
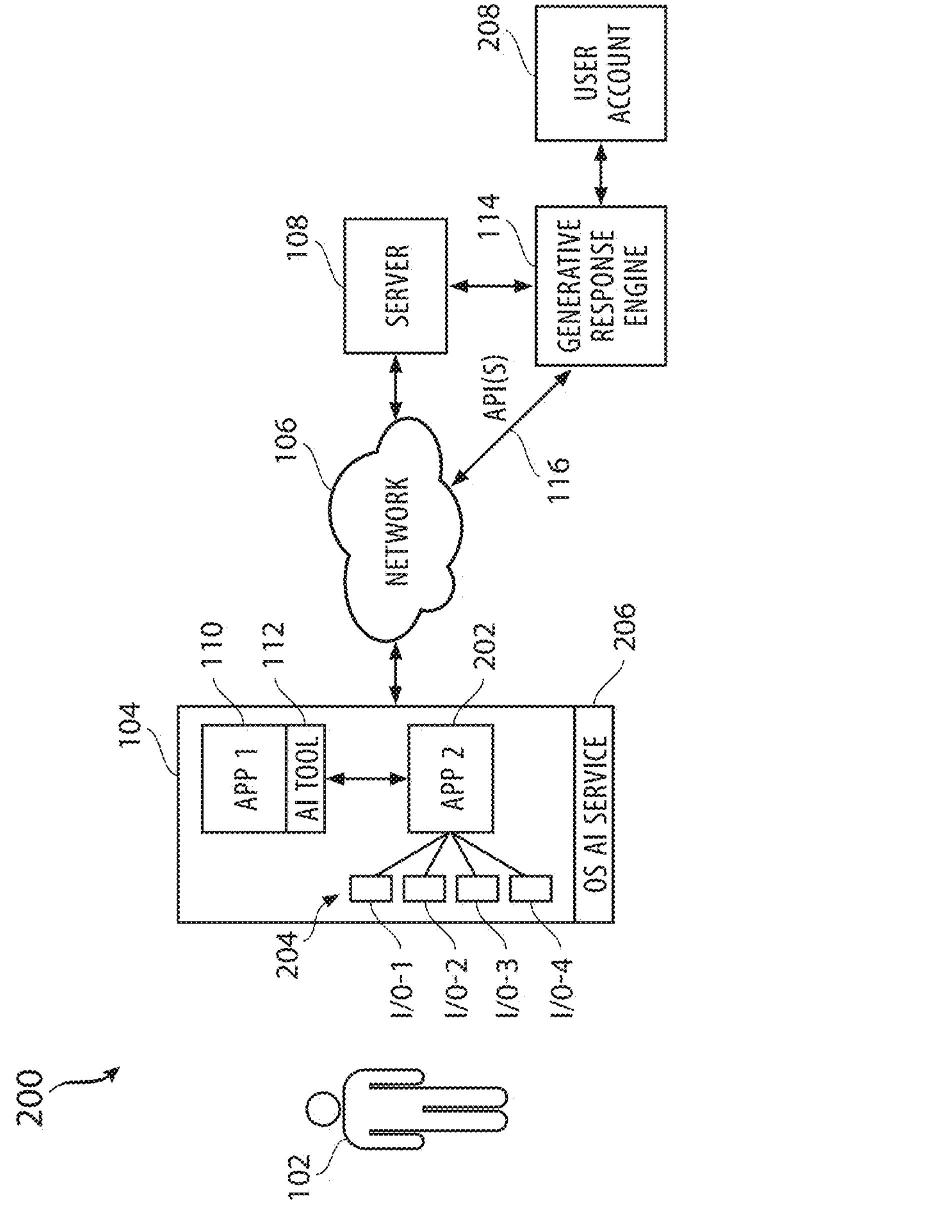
FIG. 2 is an example system including an application, a server and a generative response engine, in accordance with some aspects of the present technology.

Another aspect of this disclosure relates to the use of other applications from third-party application 110. FIG. 2 illustrates a multi-application example context 200 in which a second application 202 that is in communication with third-party application 110. Here, the third-party application can be characterized as a first application. The second application 202 can represent different types of applications with different experiences using the disclosed concepts.

For example, the second application 202 may be a writing tool, an editor, or a Google document. The user may be able to right-click on the document, which could activate a third-party application 110 or a chatbot, or other agent, and the user may say, type, or write an essay about the solar system. In this manner, second application 202 can be integrated with third-party application 110 in order to generate, via third-party application 110, a data package for transmission to generative response engine 114 in the context of the second application 202. Here, the data package can include user identification to consume resources of generative response engine 114 under the user's account rather than a corporate account of third-party application 110, and context information indicating that the second application 202 is open and will receive text in the response from generative response engine 114. Again, the rate-limiting or other quality of service limitations or entitlements are provided to the user 102 in this case, even though the communication with generative response engine 114 is via API(S) 116.

Second application 202 may be a camera or other visual application. The use of second application 202 in this context can include the ability of the user to point their camera and ask questions or provide instructions about the images. Visual intelligence in this scenario can be provided to user device 104. The user can point their camera and say "what is in this image?". The audio interactions can be managed by third-party application 110 (such as Siri), and the coordination between third-party application 110 and second application 202 can enable third-party application 110 to receive the image from the camera, include that image and user identification information in a data package transmitted to generative response engine 114 for analysis. Again, the integration or coordination between multiple applications can occur on user device 104 via operating system integration and authorizations. Here, the ability to obtain data (i.e., visual, textual, contextual) from second application 202 and generate a data package with a user query obtained via third-party application 110 and the obtained data enables a privacy-preserving, and rate-limited, personalized interaction with generative response engine 114 even though the communications are passing through API(S) 116, which can be a corporate API connected to third-party application 110.

Second application 202 might be a file in a format such as PDF or in e-Note. The user 102 can interact in some way with a user interface or otherwise to obtain a text field or have the ability to provide a voice prompt to third-party application 110 and ask "what is this late payment on my credit card?". Here, the approach is to allow third-party application 110 to access the file, and upload the file with user identification information in a data package to transmit to generative response engine 114. Generative response engine 114 can analyze the file and provide a response. In this case, third-party application 110 can obtain the response and generate an audible or textual answer such as "that charge is for a dinner bill". Thus, any kind of file can be obtained and uploaded to generative response engine 114.

Second application 202 can represent any application connected to other components of user device 104. For example, a camera, a sensor, a microphone, a keyboard, and so forth can be represented by I/O components 204, which can include one or more of I/O-1, I/O-2, I/O-3, or I/O-4, as well as any other type of I/O component. An operating system (OS) AI service such as OS AI service 206 can also be built into the operating system of user device 104. OS AI service 206 can provide coordination between different applications, access permissions to components such as I/O components 204, sensors, cameras, and so forth that are configured on user device 104. AI tool 112 can be built into any application on user device 104, although FIG. 2 only shows AI tool 112 in connection with third-party application 110. In one example, second application 202 may also be a sensor of any kind, or a multi-modal application. The AI tool 112 can be configured to enable third-party application 110 to communicate with second application 202 for the purpose of exchanging information to handle queries via third-party application 110 to generative response engine 114.

Another aspect of this disclosure can relate to image generation. More broadly, the approach can enable the user 102 to request a response of a certain type (audible, visual, images, video, text) from third-party application 110, even when third-party application 110 does not natively operate in that mode. Thus, when third-party application 110 is Siri or a voice assistant, the user could request or describe an image they desire generative response engine 114 to generate and receive that image via third-party application 110, which can make it available through another image-based application such as 'Paint', 'Adobe Photoshop', or 'Photos' on an Apple operating system, for example. Third-party application 110 may respond after receiving the image from generative response engine 114 and report "the image you requested has been added to photos as a recent import".

As an example, CHATGPT provided by OPENAI is widely understood to have been trained on Internet data and, in some respects, is an artificial intelligence tool that contains generalized knowledge from the Internet. While the Internet, and thereby CHATGPT, includes a vast amount of information, an even greater quantity and maybe a greater quality of data is not accessible on the Internet or to third-party application 110. Data from active applications that the user 102 has open on a computer is private information and is not easily available to a chatbot, but this data could provide context for an inquiry.

Accordingly, the present technology includes a system, protocol, and method by which a chatbot, tool, agent, or an application can obtain context information from active applications, inactive applications, files associated with an application, or other entities on a computer and obtain an inquiry from a user to generate a data package that includes the inquiry, identification information for the user and potentially other data such as context, conversation history, a file attached, and so forth. The application can be third-party application 110 that communicates via a company API (i.e., API(S) 116) but can utilize resources of generative response engine 14 under a personal user account 208.

Generative response engine 114 can generate content in response to a prompt. The prompt can be from a human or a software entity (AI or applications, such as third-party application 110). The prompt is generally in natural language but could be in code, including binary. Generative response engine 114 can be one or more AI model as well as other components configured to handle personalization, moderation, conversations and so forth. Some examples of AI model(s) can include language models that generate language, such as CHATGPT, Grok, or other models, such as DALL-E or IMAGEGEN, which generates images, and SORA, which generates videos. CHATGPT, DALL-E, IMAGEGEN, and SORA are all provided by OPENAI, but the AI model(s) are not limited to AI provided by OPENAI. AI model(s) can also be any type of generative AI and can include AI developed using various architectures such as diffusion models and transformers (i.e., autoregressive transformer architecture) and combinations of models. Some AI models are multi-modal models which can receive and output data in text, image, audio, etc.

In some instances, a language model, such as CHATGPT, can receive prompts to output images, video, responsive text, code, applications, etc., as will be addressed further herein. The language model or AI model(s) in the present disclosure will receive a data package that includes a prompt plus personal information of the user 102. The data package enables a personalized service, even though the data packages are communicated and received through API(S) 116 associated with a company account. The reason the data package includes the personal information of user 102 is that normally, when using API(S) 116, the third-party application 110 transmits queries to the generative response engine 114 without any identifying user 102. Without any identification of the user, the generative response engine 114 provides resources or a quality of service independent of any entitlements or restrictions associated with the personal user account 208. The third-party application 110 may have the user identification information or it may be obtained from an operating system or source from the user device 104.

AI model(s) may be part of generative response engine 114, where generative response engine 114 may include one or more components for supporting interaction with AI model(s). Users can interact with generative response engine 114 through an agent such as third-party application 110.

As used herein, generative response engine 114 encompasses deterministic services that are first party services that prepare prompts to be sent to AI models, that are primitive level services that AI model(s) can utilize to generate a response to a prompt. Services that are outside of generative response engine 114 are logically separate. Some components of generative response engine 114 might be executed by computing programming units (CPU), and some components might be executed by graphical processing units (i.e., AI model(s)).

In some embodiments, third-party application 110 might provide an audio interface or a graphical user interface that is custom to third-party application 110 or can provide a graphical user interface for other applications.

In some aspects, third-party application 110 can be a layer to accept any inputs, provide the inputs to generative response engine 114, receive an output or response from generative response engine 114, and display or audibly present the response. As third-party application 110 can also coordinate with a second application 202, third-party application 110 can further interact with the second application 202 in new ways such as writing data (i.e., text, images, code, video, multi-modal data) obtained from generative response engine 114 via API(S) 116 and right into the second application 202. For example, if the user is working in the Xcode environment and is programming a new application using an integrated development environment, third-party application 110 could obtain context information from text in a file for generating a data package to submit to generative response engine 114. Third-party application 110 can provide the audible user interface to enable the user to interact with the text file via requests to the generative response engine. For example, based on a prompt, third-party application 110 could receive new code from generative response engine 114 (that the user 102 requested it to draft) and could instruct third-party application 110 to provide the new code at a specific place in the working file of the Xcode environment.

API(S) 116 can accept structured requests containing data packages that can include prompts, context information from an application, user identification, historical information and/or configuration parameters. For example, API(S) 116 can be used to provide prompts and divide the prompt into one or more of: system prompts, user prompts and context information. In some aspects, API(S) 116 can provide specific inputs for which generative response engine 114 is configured to respond with a specific behavior. For example, API(S) 116 can be used to specify that it requires an output in a particular format or structured output. The particular format or structured format can relate to a context type or context information or to a context type (i.e., text, images or video) from a paired application. For example, in a chat completion API, the API call can specify parameters for the output, such as the max length for the desired output, and specify aspects of the tone of the language used in the response. These parameters may also relate to a framework or configuration of a coordinated application so that data from generative response engine 114 can be provided or written to a paired application in the proper format. Parameters of API(S) 116 can also relate to privacy (i.e., encode this communication from end-to-end).

In some aspects, the user 102 can communicate via the third-party application 110 and via the API(S) 116 with generative response engine 114. If an AI tool 112 or other AI application is installed on the user device 104, the use can start is an anonymous state or in a logged-out state meaning that the user first interacts with generative response engine 114 while not being formally logged into an account the user may have with generative response engine 114. The generative response engine 114 can transition the user in some aspects to the AI application (which can be represented by the second application 202) so that the same context or the same conversation can continue with the second application 202. Generative response engine 114 can thus provide for transient threads which can start on a third-party application 110 and transition to a second application 202, which may or may not be an AI front-end application for interacting directly with generative response engine 114.

Generative response engine 114 can start a conversation with a user, which may or may not be anonymous but begins with a first application such as third-party application 110. The first application may be any application however, such as an application operating as a front-end component to generative response engine 114. Data associated with a thread of the conversation can be stored by generative response engine 114. A triggering event can occur which causes the user 102 to change to a second application 202. The triggering event may be that the user provides an indication of the second application 202. The triggering event may be inferred from user interactions on the user device 102 which are communicated to generative response engine 114. Other triggering events are contemplated as well. Generative response engine 114 can obtain data about a transition to the second application 202 and can then continue or transition the thread to the second application 202 while maintaining the context of the thread. The use can have an improved experience of the thread by seamlessly transitioning to a new application while simply continuing the same thread or conversation with generative response engine 114.

Figure 3:
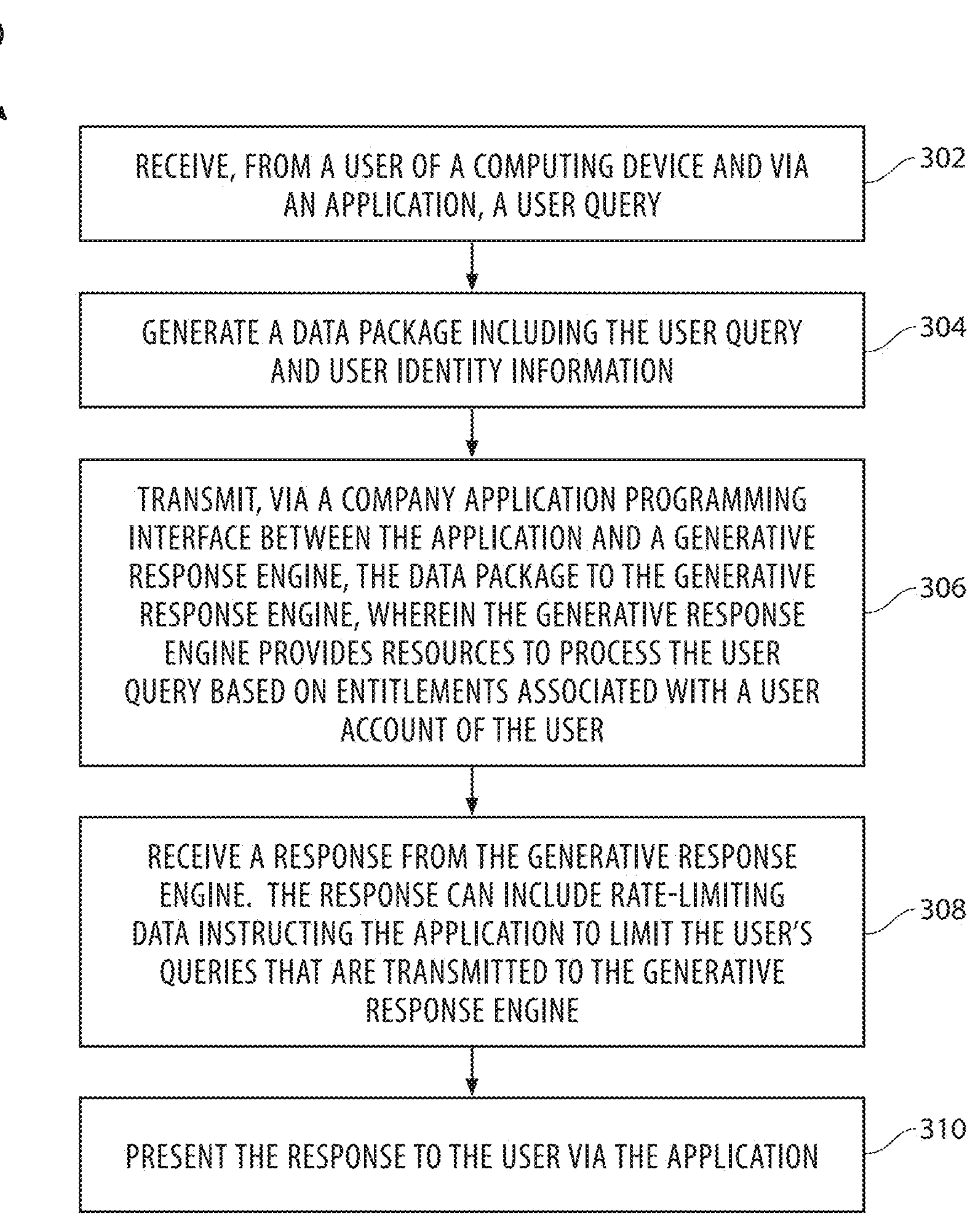
FIG. 3 illustrates an example method in accordance with some aspects of the present technology.

FIG. 3 illustrates an example method 300 of providing application assistance to accessing generative response engine 114. The method 300 relates to how a user can have a personal experience according to their user account (i.e., an expected quality-of-service, privacy and/or rate limits) for generative response engine 114 even when accessing generative response engine 114 via a company API such as API(S) 116. The method 300 can be performed by a system. The system can consist of one or more of user device 104, an AI tool 112, a third-party application 110, a second application 202, OS AI service 206, a generative response engine 114, a server 108, a computing system 400 and/or any subcomponent thereof or combination thereof. Parts of the method 300 can be performed by the same component or different components. The method 300 relates to how different applications on user device 104 will interact when one application (i.e., third-party application 110) is used as a conduit to generative response engine 114. The method 300 may include any one or more of the following described operations performed by the system.

At block 302, an operation of the method 300 is shown wherein the system can receive, from a user of a computing device and via an application, a user query.

At block 304, an operation of the method 300 is shown wherein the system can and is configured to generate a data package comprising the user query and user identity information.

At block 306, an operation of the method 300 is shown wherein the system transmit, via a company application programming interface between the application and a generative response engine, the data package to the generative response engine, wherein the generative response engine provides resources to process the user query based on entitlements associated with a user account of the user. The entitlements can be related to a quality-of-service, such as when the user pays for a premium account, or to rate-limiting requirements in which the system may manage consumption of the resources of generative response engine 114 even when accessing them through the company API.

At block 308, an operation of the method 300 is shown wherein the system can receive a response from the generative response engine. The response can include rate-limiting data instructing the application to limit the user's queries that are transmitted to generative response engine 114. For example, the application may maintain or handle the queries locally or within the application rather than escalating a query to generative response engine 114 when a rate-limit is reached.

At block 310, an operation of the method 300 is shown wherein the system can present the response to the user via the application. The response may be audible in the case of a voice-assistant like Siri, or it may be an image, text, a multimodal response, or any other type of response.

In some aspects, the system can also be configured to receive, from generative response engine 114, rate-limiting data based on the user account of the user. In some aspects, the system can also be configured to transmit the data package to generative response engine 114 according to an end-to-end encryption protocol. The end-to-end encryption protocol can secure the privacy between third-party application 110 and generative response engine 114 as well as any intervening servers or computing systems in a network.

In some aspects, the system can also be configured to limit use of generative response engine 114 for the user via the application based on rate-limiting data specific to the user account and obtained from generative response engine 114. The rate-limiting data may also be stored on user device 104 for local access. Consumption tracking for the user can be maintained on the computing device or user device and can be independent of the application to maintain privacy for the user.

In some aspects, the system can also be configured to manage, via an anonymous rate-limiting process, consumption tracking of the user without revealing an identity of the user to the application or to one or more network-based server associated with the application or in a network through which the data package would be processed.

In some aspects, the experience of the user with providing the user query and receiving a response from generative response engine 114 can be provided based on entitlements for the user according to the user account. In some aspects, privacy is maintained relative to personal data being provided to the application or an associated network server to the application via an authentication flow and via use of temporary refreshable access tokens.

In some aspects, a system for providing enhanced artificial intelligence engine language assistance is disclosed. The system can include at least one processor; and a computer-readable storage device storing instructions, which, when executed by the at least one processor, cause the at least one processor to be configured to: receive, from a user of a computing device and via an application, a user query; generate a data package comprising the user query and user identity information; and transmit, via a company application programming interface between the application and a generative response engine, the data package to the generative response engine, wherein the generative response engine provides resources to process the user query based on entitlements associated with a user account of the user.

In some aspects, a computer-readable storage device can store instructions, which, when executed by the at least one processor, cause the at least one processor to be configured to: receive, from a user of a computing device and via an application, a user query; generate a data package comprising the user query and user identity information; and transmit, via a company application programming interface between the application and a generative response engine, the data package to the generative response engine, wherein the generative response engine provides resources to process the user query based on entitlements associated with a user account of the user.

Figure 4:
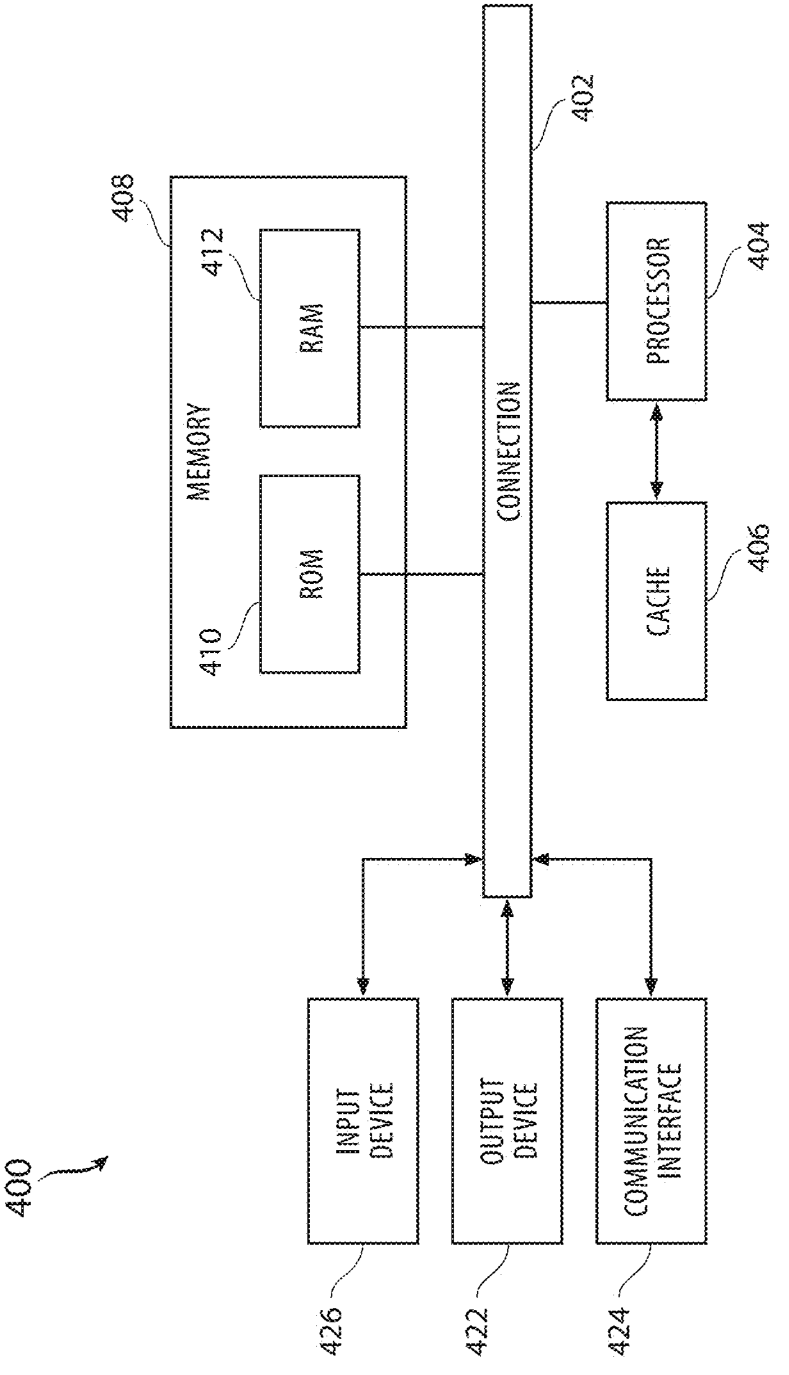
FIG. 4 shows an example of a system for implementing some aspects of the present technology.

FIG. 4 shows an example of computing system 400, which can be, for example, any computing device making up any engine, model, or component illustrated in FIG. 1 or any component thereof. In some aspects, computing system 400 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 400 may include one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 400 includes at least one processing unit (CPU or processor) such as processor 404 and connection 402 that couples various system components including system memory 408, such as read-only memory (ROM) or ROM 410 and random-access memory (RAM) or RAM 412 to processor 404. System memory 408 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

System memory 408 can include software services, servers, logic, etc., that when the code that defines such software is executed by the processor 404, it causes the system to perform a function. In some aspects, a hardware service that performs a particular function can include the software component stored in a computer-readable medium in connection with the necessary hardware components, such as processor 404, connection 402, output device 422, etc., to carry out the function.

Computing system 400 can include a cache of high-speed memory 406 connected directly with, in close proximity to, or integrated as part of processor 404.

Connection 402 can be a physical connection via a bus, or a direct connection into processor 404, such as in a chipset architecture. Connection 402 can also be a virtual connection, networked connection, or logical connection.

Processor 404 can include any general-purpose processor and a hardware service or software service stored in system memory 408, configured to control processor 404 as well as a special-purpose processor where software instructions are incorporated into the actual processor design. Processor 404 may essentially be a completely self-contained computing system, containing multiple cores or processors, a bus, memory controller, cache, etc. A multi-core processor may be symmetric or asymmetric. Processor 404 can be physical or virtual.

To enable user interaction, computing system 400 includes an input device 426, which can represent any number of input mechanisms, such as a microphone for speech, a touch-sensitive screen for gesture or graphical input, keyboard, mouse, motion input, speech, etc. Computing system 400 can also include output device 422, which can be one or more of a number of output mechanisms known to those of skill in the art. In some instances, multimodal systems can enable a user to provide multiple types of input/output to communicate with computing system 400. Computing system 400 can include communication interface 424, which can generally govern and manage the user input and system output. There is no restriction on operating on any particular hardware arrangement, and therefore the basic features here may easily be substituted for improved hardware or firmware arrangements as they are developed.

In some aspects, computing system 400 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 5:
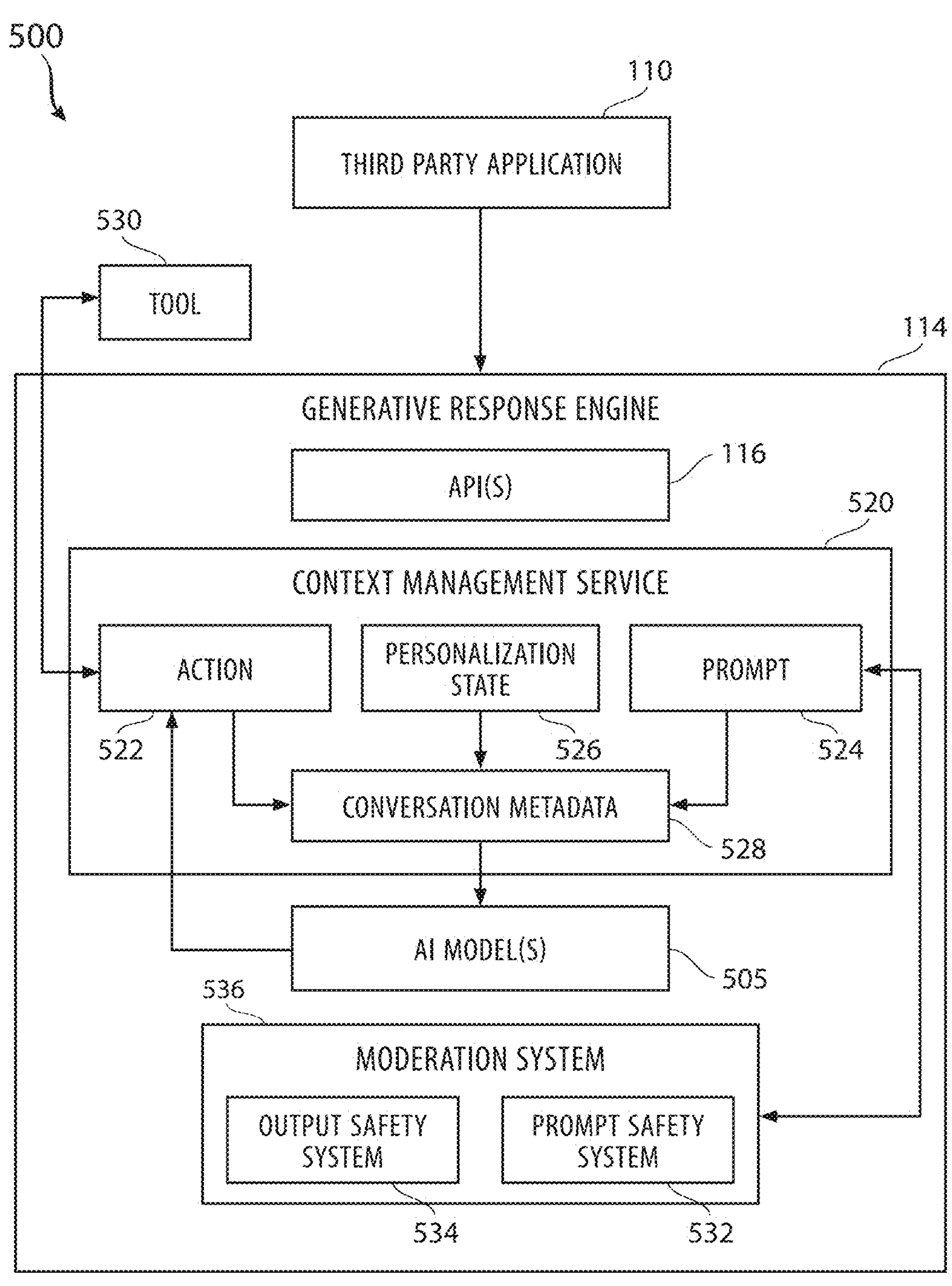
FIG. 5 shows an example system for implementing some aspects of the present technology.

FIG. 5 illustrates an example AI assistant service supporting a generative response engine 114 during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

AI model(s) 505 are artificial intelligence (AI) models that can generate content in response to a prompt. The prompt can be from a human or a software entity (AI or applications, such as third-party application 110). The prompt is generally in natural language but could be in code, including binary. Some examples of AI model(s) 505 can include language models that generate language, such as CHATGPT, or other models, such as DALL-E or IMAGEGEN, which generate images, and SORA, which generates videos. CHATGPT, DALL-E, IMAGEGEN, and SORA are all provided by OPENAI, but the AI model(s) 505 are not limited to AI provided by OPENAI. AI model(s) 505 can also be any type of generative AI and can include AI developed using various architectures such as diffusion models and transformers (e.g., autoregressive transformer architecture) and combinations of models. Some AI models are multi-modal models which can receive and output data in text, image, audio, etc.

In some instances, a language model, such as CHATGPT, can receive prompts to output images, video, code, applications, etc., which it can provide by interfacing with one or more other models, as will be addressed further herein.

AI model(s) 505 may be part of a generative response engine 114, where generative response engine 114 may include one or more components for supporting interaction with AI model(s) 505. Users can interact with generative response engine 114 through API(s) 116.

While some components are shown as being part of generative response engine 114 and some are outside of generative response engine 114, this is for illustration purposes only and some components such as tool 530 might be part of generative response engine 114, and some components such as moderation system 536 might be outside of generative response engine 114. As used herein, generative response engine 114 encompasses deterministic services that are first-party services that prepare prompts to be sent to AI models, that are primitive level services that AI model(s) 505 can utilize to generate a response to a prompt. Services that are outside of generative response engine 114 are logically separate.

Some components of generative response engine 114 might be executed by computing programming units (CPU), and some components might be executed by graphical processing units (e.g., AI model(s) 505).

In some aspects, AI model(s) 505 can provide instructions to personalization state 526 to record facts in a personalization notepad. Personalization state 526 can store information received directly from the user account or inferred from prompts provided by the user account, and can be used to provide context to the AI model such that output is personalized for the user account. Personalization state 526 can also include summaries of past conversation threads between the user account and the generative response engine 114, and/or a searchable index of past conversation threads. In this way, personalization state 526 aid generative response engine 114 and/or AI model(s) 505 to learn specific facts about a user account and recall past interactions. The past interactions can be used to guide future responses by generative response engine 114 and/or AI model(s) 505 such that generative response engine 114 and/or AI model(s) 505 becomes personalized to a particular user account.

Generative response engine 114 can provide one or more application programming interfaces (API(s)) such as API(s) 116. APIs enable developers to integrate the AI model's capabilities into external applications and services. API(s) 116 provide programmatic access to generative response engine 114, allowing for customized interactions and functionalities. API(S) 116 can refer to points of access to AI model(s) 505. In some examples, API(S) 116 endpoints are located at context management service 520.

API(s) 116 can accept structured requests containing prompts, context, and configuration parameters. For example, an API can be used to provide prompts and divide the prompt into system prompts and user prompts. In some aspects, API(s) 116 can provide specific inputs for which AI model(s) 505 are configured to respond with a specific behavior. For example, an API can be used to specify an output in a particular format or structured output. For example, in the chat completion API, the API call can specify parameters for the output, such as the max length for the desired output, and specify aspects of the tone of the language used in the response. The output can also be structured output and in a data interchange format such as JavaScript object notation (JSON). For example, the input query may include a schema that identifies a specific output structure. Some common APIs are for participating in a conversation (Chat Completion API), for providing a single response (Completion API), for converting text into embeddings (Embeddings API), etc. The API can also be used to indicate specific decision boundaries that AI model(s) 505 might be trained to interpret. For example, the moderation API can take advantage of AI assistant service 500's content moderation decision-making. In the case of the moderation API and others, the API might give access to services other than the AI model. For example, the moderation API might be an interface to moderation system 536, addressed below.

Some other common APIs include the Fine-Tuning API, which allows developers to customize AI model(s) 505 of generative response engine 114 using their own datasets; the Audio and Speech APIs, which cause AI model(s) 505 to output speech or audio; and the Image Generation API, which causes AI model(s) 505 to output images (which may request operations of other models).

There can also be APIs that direct AI model(s) 505 and/or generative response engine 114 to interface with other applications or other generative AI engines. In such cases, the specific application or AI engine might be specified, or AI model(s) 505 might be allowed to choose another application of generative response engine 114 to use in response to a prompt.

As described herein, a Responses API can be an improved API for interacting with AI model(s) 505. Responses API can take as a parameter a response ID, which can be used to return AI model(s) 505 to a state that the model was in at a particular response, thereby allowing a user account or developer to recall a previous context without having to re-prompt AI model(s) 505 or having to replicate a previous series of prompts. Further, Responses API can facilitate function/tool chaining to enable execution of operations requiring several function/tool calls without the added overhead of responding to an API caller to call the function or tool. Instead, deterministic code associated with the API can be directed to call functions or tools (including other AI models) on behalf of the AI model, and return data resulting from the function or tool call to the AI model.

In short, third-party application 110 and API(S) 116 can be used to provide prompts to AI model(s) 505 of generative response engine 114. Prompts are sometimes differentiated into prompt types. For example, a system prompt can be a hidden prompt that sets the behavior and guidelines for the generative response engine. A user prompt is the explicit input provided by the user, which may include questions, commands, or information.

Generative response engine 114 may also include a context management service 520. The function of context management service 520 is to manage and organize the flow of data among key subsystems, enabling AI model(s) 505 to generate responses that are contextually relevant, accurate, and enriched with additional information as required.

Action 522 facilitates auxiliary tasks that extend beyond basic text generation. In some aspects, action 522 can be actions that correspond to API(S) 116. In some aspects, action 522 can be agentic actions that AI model(s) 505 decide to take to carry out a user's intent as described in the prompt. For example, an action can be to call tool 530 or even other AI model(s) 505. Tools 530 can include internet browsers, editors such as code editors, other AI tools, etc. While tools are shown outside of generative response engine 114, some tools might be part of generative response engine 114 and some tools might be external tools.

Prompt 524 is the request or command provided by the user account through third-party application 110. In some aspects, prompt 524 can be further supplemented by a system prompt and other information that might be included by third-party application 110 or API(S) 116 or associated with a custom AI model. In some aspects, prompt 524 can be modified or enhanced by AI model(s) 505 as addressed further below. Additionally, as the user account provides prompts and AI model(s) 505 provide responses, a conversation thread forms. As the user account provides a new prompt, this is appended to the overall conversation and added to prompt 524. Thus, a user account might think of a first user-provided message as a first prompt and a second user-provided message as a second prompt, and so on, but prompt 524 as perceived by AI model(s) 505 can include a thread of user-provided messages and responses from AI model(s) 505 in a multi-turn conversation. The actors in the conversation thread can be labeled so that AI model(s) 505 can review the turns of the conversation. Generally, prompt 524 will include an entire conversation thread, but in some instances, prompt 524 may be shortened if it exceeds a maximum accepted length (generally measured by a number of tokens).

In some examples, context management service 520 can also route prompts and response through moderation system 536. In some aspects, prompts are provided to prompt safety system 532 before being provided to AI model(s) 505. Prompt safety system 532 is configured to use one or more techniques to evaluate prompts to ensure a prompt is not requesting AI model(s) 505 to generate moderated content. In some aspects, prompt safety system 532 can utilize text pattern matching, classifiers, and/or other AI techniques.

Since prompts can evolve over time through the course of a conversation, consisting of prompts and responses, prompts can be repeatedly evaluated at each turn in the conversation.

Personalization state 526 can facilitate continuity and personalization in conversations. It allows the system to maintain user-specific context, preferences, or details that may inform future interactions. Personalization state 526 can include a memory file of persisted data from previous interactions or sessions that provide background information to maintain continuity. In some aspects, information can be recorded to personalization state 526 at the instruction of AI model(s) 505 when AI model(s) 505 identify a fact or data that it determines should be saved in memory because the fact and/or data might be useful in later conversations or sessions. In some aspects, personalization state 526 can also include synthesized concepts extracted from past conversation threads, and personalization state 526 can also encompass the ability of AI model(s) 505 to search through past interactions to find relevant information to a current conversation thread.

Conversation metadata 528 can aggregate data points relevant to the conversation, including user prompt 524, action 522, and personalization state 526. This consolidated information package serves as the input for AI model(s) 505. Conversation metadata 528 can label parts of a prompt as user-provided, AI model-provided, a system prompt, personalization state 526, data from action 522 or tool 530 (addressed below).

AI model(s) 505 are the core engines that process inputs (from context management service 520) and generate outputs. In some aspects, AI model(s) 505 may be a generative transformer, or autoregressive transformer, but could use other architectures. In some examples, the transformer is multi-modal transformer that can use audio tokens (or embeddings thereof), visual tokens (or embeddings thereof), and language (or embeddings thereof) as needed.

A core feature of AI model(s) 505 is to generate content in response to prompts. The prompt can be from third-party application 110 provided via third-party application 110. AI model(s) 505 can be configured to receive inputs via API(S) 116 that provide guidance on a desired output. AI model(s) 505 can analyze the input and identify relevant patterns and associations in the data, and generate a sequence of tokens that are predicted as the most likely continuation of the input. AI model(s) 505 generate responses by sampling from the probability distribution of possible tokens, guided by the patterns observed during its training. Two features of the autoregressive transformer that result in this functionality are that the autoregressive transformer might use the decoder part of the transformer architecture and that it utilizes self-attention. By using the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, AI model(s) 505 can generate multiple possible responses before presenting the final one. AI model (s) 505 can generate multiple responses based on the input, and these responses are variations that AI model(s) 505 consider potentially relevant and coherent.

In some aspects, AI model(s) 505 can evaluate generated responses based on certain criteria. These criteria can include relevance to the prompt, coherence, fluency, and sometimes adherence to specific guidelines or rules, depending on the application. Based on this evaluation, AI model(s) 505 can select the most appropriate response. This selection is typically the one that scores highest on the set criteria, balancing factors like relevance, informativeness, coherence, and content moderation instructions/training.

In some aspects, an instruction provided by an API(S) 116, a system prompt, or a decision made by AI model(s) 505 can cause AI model(s) 505 to interpret a prompt and re-write it or improve the prompt for a desired purpose. For example, AI model(s) 505 can determine to take a prompt to make a picture and enhance the prompt to yield a better picture. In these instances, AI model(s) 505 can generate their own prompts, which can be provided to tool 530 or provided to AI model(s) 505 to yield a better output response than the original prompt might have.

AI model(s) 505 can also do more than generate content in response to a prompt. In some aspects, AI model(s) 505 can use decision boundaries to determine the appropriate course of action based on the prompt. In some examples, a decision boundary might be used to cause the AI model to recognize that it is being asked to provide a response in a particular format such that the AI model will generate its response constrained by the particular format. In some examples, a decision boundary can cause the model to refuse to generate a responsive output if the decision is that the responsive output would violate a moderation policy. In some examples, the decision boundary might cause the AI model to recognize that it interfaces with another AI model or application to respond to the prompt. For example, when the AI model is a language model, it might recognize that it is being asked to output an image, and therefore, it needs to interface with a model that can output images to provide a response to the prompt. In another example, the prompt might request a search of the Internet before responding. The AI model can use a decision boundary to recognize that it should conduct a search of the Internet and use the results of that search in responding to the prompt. In another example, the prompt might request that the AI model take an agentic action on behalf of the user by interacting with a third-party service (e.g., book a reservation for me at . . . ), and the AI model can use a decision boundary to recognize that it needs to plan steps to locate the third-party service, contact the third-party service, and interact with the third-party service to complete the task and then report back to the user that the action has been completed.

When AI model(s) 505 determine to take an agentic action on behalf of the user or to call a tool to aid in providing a quality response to the user account, AI model(s) 505 might call a tool 530 or cause an action 522 to be performed. As indicated above, tools 530 can include internet browsers, editors such as code editors, other AI tools etc. Actions 522 are actions that AI model(s) 505 can cause to be performed, perhaps using tool 530. As used herein actions 522 should be considered to cover a broad array of actions that AI model(s) 505 can perform with or without tools 530. Tools 530 are considered to cover a wide variety of services and software that encompass tools such as a computer operating system such that AI model(s) 505 can control the computer operating system on the user's behalf, to robotic actuators, to search browsers and specific applications.

Additionally, AI model(s) 505 can also generate portions of responses that are not displayed to the user. For example, AI model(s) 505 can provide response portions dictated by API(s) 116, where portions of the response to the API might be for the consumption of the calling application but not for presentation to the end user. In another example, some AI model(s) 505 are reasoning models, which are AI model(s) 505 that are configured to output a raw chain-of-thought before preparing a final response to a prompt. The raw chain-of-thought might not be presented to a user account or application calling an API. Instead, another AI model might summarize the raw chain-of-thought into a more consumable and useful output for the user account or application.

In some aspects, the output of the AI model can be further analyzed by output safety system 534. While AI model(s) 505 can perform some of their own moderation, there can be instances where it is beneficial to have another service review outputs for compliance with a moderation policy. The use of dashed lines in FIG. 5 differentiates a path using output safety system 534 and not using output safety system 534.

As used herein, the present description may refer to the generative response engine or AI model(s) making a determination or reasoning prior to providing a response to a prompt. Determining can refer to a process by which an AI model outputs a response that provides a conclusion. In an example, an AI model can perform an inference operation to output a sequence of tokens, which output provides a determination. In such an example, the AI model might not have made any decision other than to sample particular tokens to provide an output, yet the response from the AI model might be a statement of determination. In another example, AI models can be trained to make particular determinations. In such examples, the AI model can be trained to make a decision, such as to cross a decision boundary to take an agentic action or to call a tool, etc.

Reasoning refers to simulating logical processes to draw conclusions or perform tasks based on provided inputs and learned information. Although the AI model might lack true understanding, they use pattern recognition and linguistic associations to emulate reasoning by linking related concepts and predicting outcomes. As used herein, the term reasoning by an AI model refers to the process performed by AI models known as reasoning models.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The present technology includes computer-readable storage mediums for storing instructions, and systems for executing any one of the methods embodied in the instructions addressed in the aspects of the present technology presented below:

Aspects of this disclosure are as follows:

Aspect 1. A method of providing access to a generative response engine, the method comprising: receiving, from a user of a computing device and via an application, a user query; generating a data package comprising the user query and user identity information; and transmitting, via a company application programming interface between the application and a generative response engine, the data package to the generative response engine, wherein the generative response engine provides resources to process the user query based on entitlements associated with a user account of the user.

Aspect 2. The method of Aspect 1, further comprising: receiving a response from the generative response engine; and presenting the response to the user via the application.

Aspect 3. The method of Aspect 1 or any previous Aspect, further comprising: receiving, from the generative response engine, rate-limiting data based on the user account of the user.

Aspect 4. The method of Aspect 1 or any previous Aspect, further comprising: transmitting the data package to the generative response engine according to an end-to-end encryption protocol.

Aspect 5. The method of Aspect 1 or any previous Aspect, further comprising: limiting use of the generative response engine for the user via the application based on rate-limiting data specific to the user account and obtained from the generative response engine.

Aspect 6. The method of Aspect 1 or any previous Aspect, wherein consumption tracking for the user is maintained on the computing device and independent of the application to maintain privacy for the user.

Aspect 7. The method of Aspect 1 or any previous Aspect, further comprising: managing, via an anonymous rate-limiting process, consumption tracking of the user without revealing an identity of the user to the application or to a network-based server associated with the application.

Aspect 8. The method of Aspect 1 or any previous Aspect, wherein an experience of the user with providing the user query and receiving a response from the generative response engine is provided according to entitlements for the user according to the user account.

Aspect 9. The method of Aspect 1 or any previous Aspect, wherein privacy is maintained relative to personal data being provided to the application or an associated network server to the application via an authentication flow and via use of temporary refreshable access tokens.

Aspect 10. A system for providing enhanced artificial intelligence engine language assistance, the system comprising: at least one processor; and a computer-readable storage device storing instructions, which, when executed by the at least one processor, cause the at least one processor to be configured to: receive, from a user of a computing device and via an application, a user query; generate a data package comprising the user query and user identity information; and transmit, via a company application programming interface between the application and a generative response engine, the data package to the generative response engine, wherein the generative response engine provides resources to process the user query based on entitlements associated with a user account of the user.

Aspect 11. The system of Aspect 10, wherein the at least one processor is further configured to: receive a response from the generative response engine; and present the response to the user via the application.

Aspect 12. The system of any of Aspects 10-11, wherein the at least one processor is further configured to: receive, from the generative response engine, rate-limiting data based on the user account of the user.

Aspect 13. The system of any of Aspects 10-12, wherein the at least one processor is further configured to: transmit the data package to the generative response engine according to an end-to-end encryption protocol.

Aspect 14. The system of any of Aspects 10-13, wherein the at least one processor is further configured to: limit use of the generative response engine for the user via the application based on rate-limiting data specific to the user account and obtained from the generative response engine.

Aspect 15. The system of any of Aspects 10-14, wherein consumption tracking for the user is maintained on the computing device and independent of the application to maintain privacy for the user.

Aspect 16. The system of any of Aspects 10-15, wherein the at least one processor is further configured to: manage, via an anonymous rate-limiting process, consumption tracking of the user without revealing an identity of the user to the application or to a network-based server associated with the application.

Aspect 17. The system of any of Aspects 10-16, wherein an experience of the user with providing the user query and receiving a response from the generative response engine is provided according to entitlements for the user according to the user account.

Aspect 18. The system of any of Aspects 10-17, wherein privacy is maintained relative to personal data being provided to the application or an associated network server to the application via an authentication flow and via a use of temporary refreshable access tokens.

Aspect 19. A computer-readable storage device storing instructions, which, when executed by at least one processor, cause the at least one processor to be configured to: receive, from a user of a computing device and via an application, a user query; generate a data package comprising the user query and user identity information; and transmit, via a company application programming interface between the application and a generative response engine, the data package to the generative response engine, wherein the generative response engine provides resources to process the user query based on entitlements associated with a user account of the user.

Aspect 20. The computer-readable storage device of Aspect 19, wherein privacy is maintained relative to personal data being provided to the application or an associated network server to the application via an authentication flow and via a use of temporary refreshable access tokens.

What is claimed is:

1. A method of providing access to a generative response engine, the method comprising:

receiving, from a user of a computing device and via an application, a user query;

generating a data package comprising the user query and user identity information;

transmitting, via a company application programming interface between the application and a generative response engine, the data package to the generative response engine, wherein the generative response engine provides resources to process the user query based on entitlements associated with a user account of the user, wherein the entitlements include at least a rate limiting requirement;

managing consumption tracking of the user account without revealing an identity of the user to the application or to a network-based server associated with the application, wherein the application limits access to the generative response engine for the user based on rate-limiting data obtained from the generative response engine that is specific to the user account; and receiving a response from the generative response engine.

2. The method of claim 1, further comprising:

presenting the response to the user via the application.

3. The method of claim 1, further comprising:

receiving, from the generative response engine, the rate-limiting data based on the user account of the user.

4. The method of claim 1, further comprising:

transmitting the data package to the generative response engine according to an end-to-end encryption protocol.

5. The method of claim 1, further comprising:

limiting use of the generative response engine for the user via the application based on the rate-limiting data specific to the user account and obtained from the generative response engine.

6. The method of claim 1, wherein the consumption tracking for the user is maintained on the computing device and independent of the application to maintain privacy for the user.

7. The method of claim 1, wherein managing, via an anonymous rate-limiting process, the consumption tracking of the user.

8. The method of claim 1, wherein an experience of the user with providing the user query and receiving the response from the generative response engine is provided according to the entitlements for the user according to the user account.

9. The method of claim 1, wherein privacy is maintained relative to personal data being provided to the application or an associated network server to the application via an authentication flow and via use of temporary refreshable access tokens.

10. The method of claim 1, wherein the application enforces throttling locally based on the rate-limiting data returned by the generative response engine.

11. The method of claim 1, wherein the entitlement further includes a subscription level associated with the user account of the user and wherein the application enforces a quality of service of the generative response engine consistent with the subscription level.

12. A system for providing enhanced artificial intelligence engine language assistance, the system comprising:

at least one processor; and a computer-readable storage device storing instructions, which, when executed by the at least one processor, cause the at least one processor to be configured to:

receive, from a user of a computing device and via an application, a user query;

generate a data package comprising the user query and user identity information; and transmit, via a company application programming interface between the application and a generative response engine, the data package to the generative response engine, wherein the generative response engine provides resources to process the user query based on entitlements associated with a user account of the user and wherein the entitlements include at least rate liming requirement;

manage consumption tracking of the user without revealing an identity of the user to the application or to a network-based server associated with the application, wherein the application limits access to the generative response engine for the user based on rate-limiting data obtained from the generative response engine that is specific to the user account; and receive a response from the generative response engine.

13. The system of claim 12, wherein the at least one processor is further configured to:

present the response to the user via the application.

14. The system of claim 12, wherein the at least one processor is further configured to:

receive, from the generative response engine, the rate-limiting data based on the user account of the user.

15. The system of claim 12, wherein the at least one processor is further configured to:

transmit the data package to the generative response engine according to an end-to-end encryption protocol.

16. The system of claim 12, wherein the at least one processor is further configured to:

limit use of the generative response engine for the user via the application based on the rate-limiting data specific to the user account and obtained from the generative response engine.

17. The system of claim 12, wherein the consumption tracking for the user is maintained on the computing device and independent of the application to maintain privacy for the user.

18. The system of claim 12, wherein the at least one processor is configured to manage the consumption tracking for the user, via an anonymous rate-limiting process.

19. A computer-readable storage device storing instructions, which, when executed by at least one processor, cause the at least one processor to be configured to:

receive, from a user of a computing device and via an application, a user query;

generate a data package comprising the user query and user identity information; and transmit, via a company application programming interface between the application and a generative response engine, the data package to the generative response engine, wherein the generative response engine provides resources to process the user query based on entitlements associated with a user account of the user, wherein the entitlements include at least rate liming requirement;

manage consumption tracking of the user without revealing an identity of the user to the application or to a network-based server associated with the application, wherein the application limits access to the generative response engine for the user based on rate-limiting data obtained from the generative response engine that is specific to the user account; and receive a response from the generative response engine.

20. The computer-readable storage device of claim 19, wherein privacy is maintained relative to personal data being provided to the application or an associated network server to the application via an authentication flow and via a use of temporary refreshable access tokens.

* * * * *